United States Patent
Rao (10) Patent No.: US 6,751,614 B1
(45) Date of Patent: Jun. 15, 2004

(54) SYSTEM AND METHOD FOR TOPIC-BASED DOCUMENT ANALYSIS FOR INFORMATION FILTERING

(75) Inventor: Kalyan Rao, Bangalor (IN)

(73) Assignee: Satyam Computer Services Limited of Mayfair Centre, Secunderabad (IN)

(*) Notice: Subject to any disclaimer, the term of this patent is extended or adjusted under 35 U.S.C. 154(b) by 287 days.

(21) Appl. No.: 09/708,580

(22) Filed: Nov. 9, 2000

(51) Int. Cl.[7] .............................. G06F 17/30; G06F 7/00
(52) U.S. Cl. ............................................ 707/5; 704/245
(58) Field of Search ........................ 707/5, 104.1, 102; 704/245

(56) References Cited

U.S. PATENT DOCUMENTS

| | | | | |
|---|---|---|---|---|
| 5,864,855 A | * | 1/1999 | Ruocco et al. ................. | 707/10 |
| 6,125,362 A | * | 9/2000 | Elworthy ......................... | 707/6 |
| 6,189,002 B1 | | 2/2001 | Roitblat ........................... | 707/1 |
| 6,236,987 B1 | * | 5/2001 | Horowitz et al. ............... | 707/3 |
| 6,415,283 B1 | | 7/2002 | Conklin ........................... | 707/3 |
| 6,446,061 B1 | | 9/2002 | Doerre et al. ................... | 707/3 |
| 6,460,036 B1 | | 10/2002 | Herz | |

* cited by examiner

Primary Examiner—Greta Robinson
Assistant Examiner—Susan Rayyan
(74) Attorney, Agent, or Firm—Venable LLP; Catherine M. Voorhees (57) ABSTRACT

An information filtering process designed to sort through large volumes of dynamically generated textual information, incrementally learning process that learns as new text documents arrive and the user grades them by providing feedback. Text-based documents either dynamically retrieved from the Web or available in a textual repository on an Intranet are represented by applying key-word weighting's after capturing the user reasoning for classifying the document as relevant or irrelevant. When a new item (document) arrives, the learning agent suggests a classification and also provides an explanation by pointing out the main features (key-phrases) of the item (document) responsible for its classification. The user looks at this and provides hints by showing a list of features (key-phrases) and are truly responsible for a particular way of classifying the document. This interaction method contributes to the learning process. The apparatus includes a feedback-based clustering scheme that models user's interest profiles, a simple neural adaptation method for leaning the cluster centers to provide personalized information filtering for information seekers.

13 Claims, 2 Drawing Sheets

Fig. 2: The Feedback Process

SYSTEM AND METHOD FOR TOPIC-BASED DOCUMENT ANALYSIS FOR INFORMATION FILTERING

BACKGROUND OF THE INVENTION

1. Field of the Invention

The present invention relates to online information filtering in general, and more particularly, information filtering of Web or Intranet searching results. The method employs a rich supervised learning paradigm by accepting relevance feedback to cluster the information and more particularly it employs an efficient user-interaction-based method of text representation and cluster neighbourhood analysis providing a personalized information filtering for online search applications.

2. The Background of the Invention

The problem of information overload is overwhelming almost every Web surfer or a user scouring information from an Intranet. Information seekers on the Internet go through one or the other search engine to research a topic they are interested in. It is estimated that there are over 2500 search services. Some are directory-based where the user would drill down various levels of pre-classified information to arrive at one or two documents they might be interested in. The others are keyword-driven search engines where the user specifies the keywords that drive the search process and the search engine brings up numerous results, which the user has to browse and find out where they are of any relevance. Most search services have a combination of both.

Most of these search engines offer little or no personalized features. The user would be treated as an anonymous visitor who gets inundated with a lot of irrelevant information. For instance, if the user is searching for information about the interest, Cricket, obviously all the documents that are related to the game of Cricket will be non-sense to the user. But most search engines have little or no feature to enable the user to specify and interact with the search facility such that they get the right type of information. Instead, if we could somehow recognise the user (as if we know his or her interests) under a Topic profile, it would be a lot more effective in getting accurate information seen by the user.

Another big limitation with most search engines is that the amount of time and expertise spent in researching a subject area is never remembered. There is nothing like a "stop and resume" interface. The work involved in researching and judging documents as relevant and irrelevant has to be repeated over and over each time the search engine is used to look for information in that subject area.

Publicly indexed information available to a Web user is exploding as days pass by. A typical search engine throws up hundreds of results for a user query. A very good document could be at the bottom of the pile. Not all of these hundreds of results will be useful to the user. Instead the user would like the information to be presented in a classified manner either by relevancy or by the nature of the concept the documents cover and the concepts the user likes.

DESCRIPTION OF RELATED ART

Information filtering algorithms are designed to sort through large volumes of dynamically generated information and present the user with those that are likely to satisfy his/her information requirement. With the growth of the Internet and other networked information, research in the development of information filtering algorithms has exploded in recent years. A number of ideas and algorithms have emerged.

Some of the earlier approaches have adopted what is known as the classical supervised learning paradigm. In this paradigm, when a new icon (document) arrives, the learning agent suggests a classification, the supervisor (user) would provide a classification, and the difference is used to adjust parameters of the learning algorithm. In such a paradigm, the agent's classification and the user's classification can be independent processes. The user can also give a classification even before seeing the agent's classification.

Learning itself can be either "supervised" or "unsupervised". In supervised learning networks the input and the desired output are both submitted to the network and the network has to "learn" to produce answers as close as possible to the correct answer. In an unsupervised learning network the answer for each input is omitted and the networks have to learn the correlation between input data and to organise inputs into categories from these correlations.

Supervised learning is a process that incorporates an external teacher. It employs Artificial Neural Networks that are particularly good at dealing with such ill-structured documentation handling and classification tasks that are usually characterised by a lack of pre-defined rules. The network is given a set of training patterns and the outputs are compared with desired values. The weights are modified in order to minimise the output error. Supervised algorithms rely on the principle of minimal disturbance, trying to reduce the output error with minimal disturbance to responses already learned.

The application of supervised learning paradigms will improve the performance of a search system. While an unsupervised approach may be easier to implement, since it does not require external intervention, a supervised approach could provide much better results in situations where a thesaurus or a knowledge base already exists or when a human expert can interact with the system. The objective is to employ neural techniques to add the "intelligence" needed in order to fulfil the user requirements better. Systems employing these models exhibit some of the features of the biological prototypes such as the capability to learn by example and to generalise beyond the training data.

Both supervised and unsupervised approaches rely upon a technique of document representation. It is a numerical representation of the document, which is used to produce an ordered document map.

One of the standard practices of document representation in information retrieval (IR) systems is the Vector Space information paradigm. This approach encodes the document set to generate the vectors necessary to train the document map. Each document is represented as a vector (V) of weights of keywords identified in the document. The word weight is calculated using the Term Frequency*Inverse Document Frequency (TFIDF) scheme which calculates the "interestingness" value of the word. Such formulae are used to calculate word weights and used to train the networks to create the information map.

Document representation techniques are used in the classification of textual documents by grouping (or clustering) similar concepts/terms as a category or topic, a process calling for cluster analysis. Two approaches to cluster analysis exist: the serial, statistical approach and the parallel, neural network approach.

In the serial approach, classes of similar documents are basically found by doing pairwise comparisons among all of the key elements. This clustering technique is serial in nature in that pairwise comparisons are made one at a time and the classification structure is created in a serial order. The parallel neural network approach is based on establishing multiple connections among the documents and clusters of documents allowing for independent, parallel comparisons.

A significant number of text-based classification algorithms for documents are based on supervised learning techniques such as Bayesian probability, decision trees or rule induction, linear discriminant analysis, logistic regression, and backpropagation-like neural networks In spite of so many complex techniques researched to solve the problem of information filtering, the process of Searching (esp. on the Internet) is yet an unresolved problem.

Accordingly it is the object of our invention to make an attempt and provide a more effective and efficient neural network based supervised learning process that learns incrementally as documents arrive and the user grades them by providing feedback to the learning agent. The technique described in this invention can be called Supervised Clustering Analysis.

SUMMARY OF THE INVENTION

There is a need for personalization of the information searching either on the Web environment or in an Intranet supporting user participation in grading and ranking documents.

There is a need for automatic learning agents, which build subject profiles in which a user's feedback is captured and used to learn about the user's interests for pushing the right information and collaborating with others.

These and other needs are attained by the present invention, where whenever a new document arrives, a learning agent suggests a classification and also provides an explanation by pointing out the main key-phrases of the document responsible for its classification.

The user looks at this, gives his/her classification and then provides hints by showing a list of key-phrases that according to the user, are truly responsible for the classification suggested by the user. In this way the user's classification is truly of a feedback nature.

The algorithm behind the invention has three major parts.

Document Representation

Feedback and Learning

Classification

This information filtering process is designed to sort through large volumes of dynamically generated textual information, to incrementally learn as new text documents arrive and the user grades them by providing feedback.

Text-based documents either dynamically retrieved from the Web or available in a textual repository on an Intranet are represented by applying key-word weighting's after capturing the user reasoning for classifying the document as relevant or irrelevant.

When a new item (document) arrives, the learning agent suggests a classification and also provides an explanation by pointing out the main features (key-phrases) of the item (document) responsible for its classification. The user looks at this and provides hints by showing a list of features (key-phrases) that are truly responsible for a particular way of classifying the document.

This interaction method contributes to the learning process. The apparatus includes a feedback-based clustering scheme that models user's interest profiles, a simple neural adaptation method for learning the cluster centres to provide personalized information filtering for information seekers.

BRIEF DESCRIPTION OF THE DRAWINGS

Reference is made to the attached drawings, wherein elements having the same reference numeral designations represent like elements throughout and wherein.

DETAILED DESCRIPTION OF THE INVENTION

Before the detailed description of the invention is narrated, the list of terms used in this document are all collected and defined in the table below in the form of a glossary.

| Item | Symbol | Definition |
| --- | --- | --- |
| Document | D | A unit of writing analyzed for relevance or irrelevance to the user based on the information contained |
| Topic | T | User's interests in a subject profiled in the form of a list of key-phases of relevance or irrelevance as far as the subject in concerned. |
| Occurrence strength | OS | Defines the importance with which a key-phrase occurs in a document. It is derived by multiplying the Number of occurrences of key-phrase * an appropriate factor (Factor = Title: 1.0, Header: 0.75, Text: 0.5, Footer: 0.25) Factor may also be heuristically determined. |
| Key-phrase strength | S | Minimum of (1, occurrence_strength) |
| Raw Document Representation (RDR) | RDR | N-dimensional column vector of key-phrases/strengths Example: {Key-phrase1 0.5, Key-phrase2 0.25, Key-phrase3 1.0, Key-phrase4 0.75} |
| Co-occurrence matrix | Co | Defines how a pair of key-phrases co-occur in documents. |
| Probability Matrix | P | N x N dimensional matrix indicating the probability with which the presence of a key-phrase implies the presence of another key-phrase. |
| Expanded Document Representation | EDR | N-dimensional column vector of key-phrases. This vector representation of documents not only considers the strengths of key-phrases but also their co-occurrence probabilities. |
| Cluster | C | A set of similar documents of relevance or irrelevance. |
| Cluster center | CC | N-dimensional vector with strength values of key-phrases which strongly represent the cluster. This is also the mean of the vector spaces (EDR's) of documents representing the cluster. |
| Strategic Weight | SW | Function of key-phrase's actual weight in the document and the weight with which it is represented in the center. |
| Cluster Type | CT | Indicates whether the cluster represents a collection of documents of relevance or irrelevance (positive or negative) to the user. |
| Word_factor | W | Defined for a key-phrase. Denotes how strongly it helps in classifying the document. It means the because of the key-phrase either the Number of positive docs. that contain the phrase or the Number of negative docs. that contain the phrase is greater than the other |
| Distance | Di | Distance of the document from the cluster center CC. |

-continued

| Item | Symbol | Definition |
|---|---|---|
| Threshold | T | Represents the distance from the centre of the cluster to the Origin |
| Origin | O | An imaginary document which has very weak or zero strength values for all key-phrases representing the cluster center. |

Every text-based document consists of keywords and phrases occurring with different densities. The importance of a word or a phrase is decided by not only the number of times they appear within the document but also by the size of the document itself.

Before each document is classified it is represented numerically so that it can be appropriately clustered.

Document Representation

Topic is a list of key-phrases. These key-phrases can be relevant to the Topic either by presence or by absence. Typically this list changes dynamically as the user sees new documents and remembers (or stumbles upon) key-phrases relevant to the Topic.

Initially the list can be empty. A new document that arrives is graded by the user as relevant or irrelevant by giving a reasoning. The reasoning is given in the form of key-phrases present or absent because of which the document is graded as relevant or irrelevant.

Strength of key-phrase

For each key-phrase in the list a strength value is assigned that denotes how strongly the key-phrase occurs in the document.

A document has many parts in it like Title, Header, Body, and Footer where Title has the highest importance and Footer the least.

The strength factors associated with each part of the document will have base values as 1 for title, 0.75 for Header, 0.25 for Body and 0.1 for Footer. Then, these strength factors are normalised by making them a function of the size of the document.

Suppose a key-phrase occurs just once in the Title of the document. Then, because of the importance of its location, which is Title, a strength value of 1 is assigned for this occurrence. So occurrence_strength (OS)=1.

Suppose a key-phrase occurs twice, both the occurrences being in the main body (text) paragraphs. Then OS is calculated as strength factor multiplied by 2. That is OS=2*0.25. In essence, what this means is that for occurrences of the key-phrase in a document implies that the key-phrase is present very strongly in the document. Since the strength factor should also be linked to the size of the document, the strength of the key-phrase may vary depending on its density in terms of the number of occurrences of the key-phrase vis-à-vis the number of paragraphs in the document.

This strength is heuristically determined. If the document has only three paragraphs or less, then the factor can be set to be a high value like 0.5 meaning that even two occurrences indicate a strong presence of the key-phrase. On the other hand, if the document has 100 paragraphs or more, then the factor can be made as low as 0.1 meaning that ten occurrences are really needed to indicate a strong presence of the key-phrase.

It is made such that the strength value is a number between 0 and 1 by applying the "minimum" operation.

Key-phrase Strength=minimum (1, occurrence_strength)

The occurrence_strength is obtained by looking at the various occurrences of the key-phrase in the document, giving different strength values to each of these occurrences depending on the importance of the location of occurrence, and summing these strength values.

Synonyms of a key-phrase are treated in the same way as if all of them mean one and the same key-phrase.

Raw Document Representation

Document representation is carried out with respect to a Topic that has several key-phrases. For example a Topic like Travel can have the following key-phrases.

"Living and Accommodation"

"Tourist Locations"

"Local Transport"

"Seasons"

"Shopping Centers"

"Food and Culture"

"Environment"

For each of the N key-phrases relevant to the Topic text processing is carried out on the analysed document to compute the strength value as described above.

These strength values are put together in an N-dimensional column vector. This column vector representation of the document is called Raw Document Representation (RDR).

Expanded Document Representation

The RDR is expanded by applying a transformation on it. This is based on a simple idea that, if A and B are two key-phrases such that the presence of A implies the presence of B with probability P, then, occurrence of key-phrase A with strength $S_a$ in the document implies the occurrence of key-phrase B with strength $P*S_a$.

Co-occurrence information is learnt between all pairs of key-phrases. Co-occurrence information is learnt by building a two-dimensional matrix where each element (ij) tells the occurrence_strength of a pair of key-phrases i and j occurring together.

Co denotes an N×N Co-occurrence matrix. The learning agent starts by initially setting the matrix to zero. Whenever a document, X with a RDR arrives and is shown to the agent the matrix is updated.

$$Co=Co+(RDR \text{ of } X)(RDR \text{ of } X^T)$$

where $T$ denotes matrix transpose. The probability with which the presence of the i-th key-phrase implies presence of the j-th key-phrase (where i≠j) is taken to be $$P_{ij}=Co_{ij}/Co_{ii}$$

where $Co_{ij}$ denotes the (ij)-th element of the matrix Co. This gives the probability matrix.

Co is maintained and updated while the probabilities are computed by the above formula as and when required using current Co.

Because $P_{ij}$ is being approximately computed by statistical means $P_{ij}$ will not be used until at least 5 documents containing the i-th key-phrase have been used for computing Co.

From the RDR, the document's Expanded Representation (EDR) is derived using the following formula.

$$\text{Expanded representation}=D_j=\text{minimum}\{1, X_j+0.5*\text{minimum}\{1, \Sigma_i P_{ij} X_j\}\} \forall j$$

Where $j$ runs through all the key-phrases in the document vector and for each key-phrase the co-occurrence probabilities with all the other key-phrases are considered through the $\Sigma_i P_{ij}$ factor.

As can be seen from the above formula, EDR is also an N-dimensional vector. The inner "minimum" operator and the factor, 0.5 are present to avoid any excessive effects of document expansion on the RDR. This is required because while the expansion scheme is useful for giving a better representation of the document-key-phrase relationships, it does not formally take into account the joint effect of the presence of a group of key-phrases on the presence of another key-phrase.

Document Clustering

Clusters of documents suiting user's interest profiles are created in the form of several N-dimensional vector spaces of key-phrase strengths. A cluster represents a set of similar documents, of relevance or irrelevance to the user.

Cluster that represents a set of relevant documents is known as having Positive type. Cluster that represents a set of irrelevant documents is known as having Negative type. Associated with each cluster are four items.

Type: This is a binary variable taking its value from {positive, negative} denoting whether the cluster represents a similar set of relevant or irrelevant documents.

Center: This is an N-dimensional real vector that can be thought of as the mean of similar documents that are associated with the cluster. For example, if the Topic is Sports and a cluster represents user's positive interest in articles on Michael Jordan, then the center of this cluster will have high-values for key-phrases such as "Michael Jordan", "Basketball", "NBA", "Chicago Bulls" and weak values for key-phrases denoting some other players in the Basketball world, and almost zero values for other key-phrases in the Sports topic.

Threshold: This is a non-negative real number that denotes the radius of the cluster. Any document whose vector representation (EDR) is at a distance (defined below) less than the threshold from the center will be taken as belonging to the cluster.

List of document vectors: This is a list of vectors containing the EDR of all documents that were won by the cluster and graded by the user. The concept of winning is explained below in the context of explaining the details of the learning algorithm.

The learning algorithm dynamically forms the clusters, during the feedback stage. Once this takes place, all items associated with the clusters except Type constantly undergo changes.

Additional Notes: Analysis of the behaviour of a typical user shows how they define their positive interests and point out negative interests as exceptions. Therefore there is a possibility that a cluster of a negative type will form a pocket (hole) in a cluster of a positive type. This pocket or hole is also referred to as an embedding. For example, a user likes articles on "Life on Mars" but they are not interested in "Life on Mars" articles related to "Pathfinder".

There are two clusters here. A positive type cluster connected around key-phrase "Life on Mars" and a negative type cluster centered around the combination, ("Life on Mars", "Pathfinder"). The negative cluster forms a pocket in the positive cluster.

Although an article like "Pathfinder findings about Life on Mars" has the key-phrase "Life on Mars" it belongs to the negative cluster because of the presence of "Pathfinder".

This organization is taken into account whenever a new document that arrives has to be classified using the cluster information.

Distance Measure

To associate a document with a cluster, the distance, $Di$ of the EDR of the document from the cluster center, CC has to be defined.

This is done by giving different weights to different key-phrases.

For each key-phrase a word_factor is defined that denotes how strongly the key-phrase helps in classification.

Let $N_+$ denote the number of positive documents that contain the key-phrase.

Let $N_-$ denote the number of negative documents that contain the key-phrase.

Negative documents are the ones that have other key-phrases in addition to the relevant key-phrase that make the document on the whole irrelevant to the user.

Let N be the total number of documents that contain the key-phrase.

If either $N_+/N$ is high, it means that this key-phrase can be very helpful in classification. This word_factor is defined as follows.

$$\text{word\_factor} = \text{maximum}(3, N_+, N_-)/\text{maximum}(3, N).$$

The above formula makes sure that word_factor takes a value between 0 and 1. The factor 3 is included in the above formula to make sure that there is no large variation in word_factor during the initial learning phase.

With word_factor defined, the distance of the EDR from the cluster center, CC can be defined next.

$$\text{distance}(Di) = \Sigma_{i:ci>0.5} \text{word\_factor}_i * CC_i * \text{maximum}(\{CC_i - EDR_i * \text{strategic\_weight}_i, 0\})$$

where strategic_weight (SW) for a key-phrase is a number which is more than or equal to 1.0 and i runs through all the key-phrases in the Topic. $CC_i$ can also take a value of zero.

Strategic_weight is determined by the key-phrase's actual weight in its RDR and the weight with which it is represented in the cluster center. This is done to take care of the particular key-phrases, which the user shows during feedback because they are user's particular choices.

For the user-specified key-phrases more stress is applied while calculating the distance simply because they are relevant to the user. Thus though the key-phrase might have only a poor weight so far as the document is concerned, it must be boosted up while computing its "actual" weight and distance from the center.

For example, a key-phrase may have a weight of 0.25 in the RDR, but the representation in the cluster center is 0.51 because of the user-feedback. (This is explained more in the section, Feedback & Learningbelow). Then the strategic weight is 0.51/0.25 or approximately 2.0. In other words strategic weight is derived by dividing $CC_1$ by $EDR_1$.

The use of the "maximum" operator makes the distance asymmetric, i.e. the distance of D from CC is not the same as the distance of CC from D. The reason for using the "maximum" operator is as follows.

If the i-th key-phrase occurs more strongly in the document than the in the CC, that is acceptable, while the reverse situation needs to be penalized by how smaller $EDR_1$ is than $CC_1$.

The multiplication factor $CC_i$ is employed to give more importance to stronger key-phrases of the cluster center.

The summation is made only over strong key-phrases (those with $CC_1 > 0.5$) to avoid many weak key-phrases of the cluster center combining together to spoil the effect of a few strong key-phrases.

The reason for keeping weak key-phrases in the cluster center at non-zero values is that, a particular key-phrase, which is strongly associated with the interest profile represented by a cluster, may be weak at the beginning of learning. It becomes strong as more and more documents are classified and agreed upon by the user and adaptation of the cluster center to the mean of the documents take place.

Setting the Threshold

The distance measure computed before can be used to define the threshold for each cluster.

For clusters of the positive type, it is defined as follows.

$$\text{Threshold} = 0.5 * \text{distance of CC from the origin.}$$

Here "origin" represents an imaginary document, which has zero strength values for all the key-phrases represented by the cluster.

Roughly what this means is that, at least half the strong key-phrases of the cluster center must be strongly present in a document if that document is to belong to that positive cluster.

For clusters of the negative type, it is defined as follows.

$$\text{Threshold} = \text{minimum (alpha, beta)}$$

Where alpha=0.25*distance of CC from the origin and beta=minimum$_{d \text{ in set of all documents}}$ distance of Document from C.

As marked before, a cluster of the negative type is usually formed as a pocket within a positive cluster and so it is important to set its threshold so that no positive document belongs to it, this explains the beta factor.

The alpha term is similar to the threshold term of a positive cluster, except that the factor 0.5 has been changed to 0.25. The smaller factor makes it more difficult for a document to belong to a negative cluster than a positive cluster. The argument for this is that, while it is alright to make an error in deciding an irrelevant document as relevant, it is dangerous to decide a relevant document as irrelevant and take the risk of the user not seeing the document at all.

Classification of a New document

Whenever a new document arrives, two things will take place before the user gets to see the document.

Decide a classification or grade for the document (i.e. choose whether the document should belong to one of the categories, Highly Relevant, Relevant, Average, Irrelevant, High Irrelevant).

Make a list of key-phrases that were responsible for the classification

To do classification, first text processing is done to compute the document representation, (EDR).

Then the distance of this representation from the center of each cluster is computed and a list of clusters to which the document belongs to is prepared.

If this list is empty, the agent declares the grade for the document as unclassifiable and consults user feedback.

If the list is non-empty, it is possible that it has more than one cluster. This non-uniqueness has to be resolved so that a unique cluster is associated with the document and hence a clear explanation (pointing to the responsible key-phrases) is shown to the user using information associated with the cluster.

One of the ways to resolve this is to find the cluster where the distance, Di from the cluster's center is the smallest. This cluster can be decided to be unique cluster owning the document.

The other method is to determine the dot product measure between D and CC. This will more effectively resolve the non-uniqueness.

$$\text{dot\_product} = \Sigma_i (\text{word\_factor})_i * C_i * D_i * SW_i$$

where C is the winning cluster.

Thus from among the clusters to which the document belongs, the cluster whose center makes the largest dot_product with D is identified.

Any further tie in this step is resolved arbitrarily.

This cluster is referred to as the winning cluster and the cluster is said to have won the document.

4.2.8. Grading a New document

Documents are graded in order to decide the relevance category they should be put into. These categories could be Highly Relevant, Relevant, Average, Irrelevant and Highly Irrelevant.

Numerical values are assigned to user grades as follows.

| | |
|---|---|
| High Relevant | 1.0 |
| Relevant | 0.5 |
| Average | 0.0 |
| Irrelevant | −0.5 |
| Highly Irrelevant | −1.0 |

Associated with each cluster is a list of document vectors that have been won by that cluster and graded by the user, in the past.

For each document in the cluster a Score is calculated which helps in grading the document.

Let {(D', s')} denotes the list of (document vector, score) pairs associated with the winning cluster.

Given a new document, D, its distance, ρ'(rho) is computed from each D'. The new document, D represents EDR of the document.

A numerical score is assigned for the new document as follows.

$$\text{Score} = \Sigma_i (\rho^i/\rho) * s^i$$

where $\rho = \Sigma_i \rho^i$.

If ρ turns out to be zero the Score is set to average of $s^i$.

Once the Score is computed the agent's grade of the document is determined as follows.

| Agent's Grade = { | | |
|---|---|---|
| | Highly Relevant | if Score is greater than or equal to 0.6 |
| | Relevant | if Score is between 0.25 and 0.6 |
| | Average | if Score is between 0.0 and 0.25 |
| | Irrelevant | if Score is between −0.75 and −0.5 |
| | Highly Irrelevant | if Score is less than or equal to −0.75 |
| } | | |

Key-phrases that are responsible for agent's classification are chosen to be the set of all key-phrases which have values more than 0.4 in both the document representation and the winning cluster's center.

Representative sentences containing these key-phrases are also picked up from the document for showing document summaries to the user.

Figure 1:
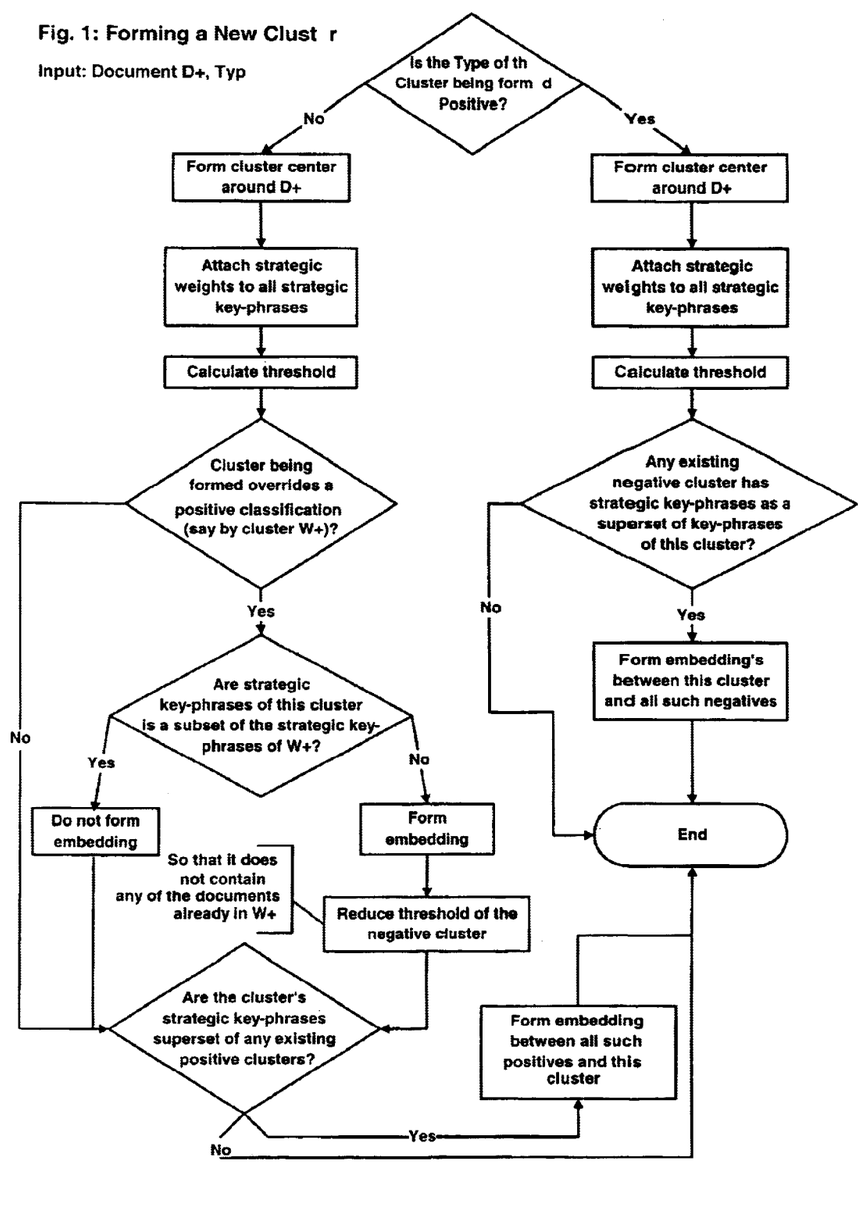
FIG. 1 is a schematic diagram depicting the process of formation of a new cluster.

FIG. 1 describes the steps involved in the formation of a new cluster. Input document D with type T in order to form a new cluster. A check is made to determine if the cluster being formed is of the positive type. If it is so, a cluster is formed about the center of D. Since a user can point out some weakly occurring key-phrases, it is important to boost the importance of these key-phrases. This is described in the section entitled Forming a new cluster. If Strategic Weights are attached to strategic key-phrases as explained above and in the section Forming a new cluster. The threshold is calculated as described in Setting the Threshold. A check is made to determine whether any existing negative cluster has key-phrases (KPs) as a superset of the KPs of the cluster being formed. If so, reduce the threshold to define the cluster as an embedding to reduce overlapping of multiple clusters.

On the other hand, if the cluster being formed is negative, a negative cluster is formed around document D. Then, compute and assign strategic weights to strategic key-phrases (KPs) as explained above and compute the cluster threshold. Next, determine if the cluster being formed overlaps with any positive cluster (say W). If so, check whether the strategic key-phrases of the cluster being formed is a subset of key-phrases (KPs) of W. If this is the case, there is no need to form an embedding. If this is not the case, form an embedding and reduce the threshold of the negative cluster being formed. Finally, if the cluster's strategic key-phrases are a superset of any existing positive cluster, form an embedding between all such positive clusters and the cluster being formed.

Neural Adaptation based on User Feedback

Once the document has been evaluated by the agent, it is displayed to the user with the agent's grade and the responsible key-phrases appropriately highlighted on the document.

Figure 2:
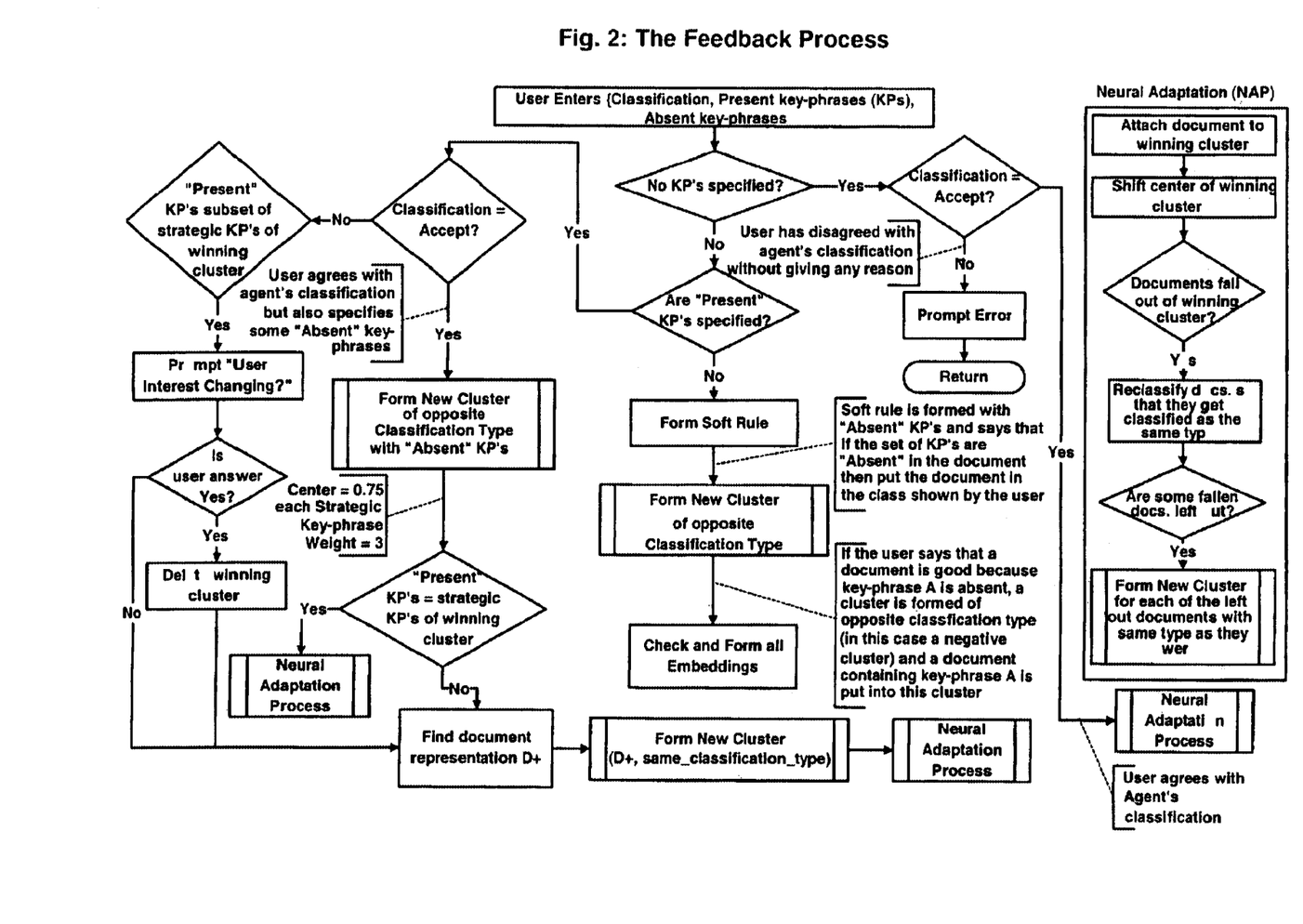
FIG. 2 is a schematic diagram depicting the process of feedback & learning and document classification.

As shown in FIG. 2, the user now gives feedback by grading the document and additionally pointing out one or more key-phrases as clues to the reasoning that led to the assigned grade.

These key-phrases may be present or absent in the current document and the document itself may be a new one or an old one. This feedback is utilized by the agent for learning, i.e. update the cluster information.

Let representation of the current document be D.

Let agent_type be positive, if Agent's Grade is in the Set, {Highly Relevant, Relevant, Average}

Let agent_type be negative, if Agent's Grade is in the set, {Highly Irrelevant, Irrelevant}

Let agent_type be null, if Agent's Grade is "unclassifiable".

Similarly let user_type be a function of user's grade.

The assumption here is that the user is giving feedback and that the feedback is not null.

The Feedback learning algorithm goes through the following steps to adapt itself to user's interests.

Step 1

---

Step 1

If the user has pointed out at least one key-phrase then through text processing, the current document is analyzed to calculate strengths of all new key-phrases and the document representation. D is updated to include all these new key-phrases.
Also to all centers and documents representations in the agent's database, zeroes are appended in the rows at the bottom corresponding to each new key-phrase.

Step 2

Step 2

If user_type is NOT same as Agent_type then skip to Step 4
If there are key-phrases pointed out by the user then skip to Step 3
The winning center is modified according to the neural adaptation rule:
winning center = $(1-\epsilon)$ * winning center + $\epsilon$*d
where $\epsilon$=0.1 is the adaptation step size.
Note: The neural adaptation rule has been used here so as to move the center if each cluster towards the mean of the documents won by that cluster.
In course of time, this neural adaptation achieves two things.
Drives the center values of all key-phrases unrelated to the interest profile represented by the cluster to zero♦.
Makes stronger center values for all key-phrases that are truly related to the cluster$^\psi$.
Most neural adaptation rules slowly decrease $\epsilon$ towards zero as a function of the number of adaptation steps in order to ensure convergence. Here $\epsilon$ is kept constant so that more importance is given to documents that arrived more recently.
The threshold of the winning cluster is computed.
Skip to Step 7.

Step 3

Step 3

In D, the value of each uese-pointed key-phrase that is present in the current document is increased to 0.51 in case it is below 0.51.
A new cluster is formed with
→ type = user_type,
→ center = the modified d and
→ list of document vectors = {the modified d}
Example: Suppose the user likes documents of "Life on Mars" and a positive cluster has already been formed around this single key-phrase. Now, suppose the current document is a special "Life on Mars" article about "Meteorite Evidence". The article belongs to the earlier formed cluster with "Life on Mars" as the key-phrase, and so the agent grades the article as being relevant.
Suppose the user agrees with this classification but also takes the extra effort to point the new key-phrase, "Meteorite Evidence". What the user probably means is that articles relating to "Meteorite Evidence" deserve special treatment. Therefore, it is a good idea to form a new cluster with the key-phrase, "Meteorite Evidence" present strongly. Even if the user does not exactly mean the need for a special treatment, the creation of the new cluster doesn't cause harm to future agent classifications in any way.
Skip to Step 6.

Step 4

Step 4

If key-phrases pointed out by the user present in the document then skip to Step 5.
Otherwise continue.
If D is not weak (i.e. it has at least one $D_1$ that is greater than 0.5) then a new cluster is formed with
→ type = user_type,
→ center = D and
→ list of document vectors = {D}
Skip to Step 6.
Note: Suppose the user disagrees with the agent's classification of the current document, but feels that pointing out the special key-phrases is not necessary and that the key-phrases, which are already with the agent are sufficient.
In such a case, this step simply forms a cluster of the user-type around the current document's representation. It is important to ensure that not all values of the center are weak. This is for the reason that if a center has all its values less than or equal to 0.5, then according to the distance measure, any document will belong to the corresponding cluster, which is dangerous.

Step 5

| Step 5 |
|---|
| In D, the value of each user-pointed key-phrase is increased to 0.75 if it is not already so and the value of each of the other key-phrases is decreased to 0.51 in case it is above 0.51.<br>A new cluster is formed with<br>→ type = user_type,<br>→ center = the modified D and<br>→ list of document vectors = {the modified D}<br>Skip to Step 6<br>Example: As in the example give under Step 3, suppose there is already one positive cluster with "Life on Mars" as its main key-phrase. Suppose the current document is about "Galileo" and "French Explorer" projects to Mars, the two projects in which the user has no interest. Although the agent grades the article as relevant because of the occurrence of the key-phrase "Life on Mars", the user grades it irrelevant and points out the key-phrases, "Galileo" and "French Explorer". In this scenario, this step of the algorithm creates a negative cluster whose center has these two key-phrases strongly represented. |

Step 6

| Step 6 |
|---|
| If the user has pointed out key-phrases, which are, absent in the document, then another cluster is formed with<br>→ type = user_type,<br>→ for all i, center = {<br>   0.75 - if i-th key-phrase is absent<br>   0.51 - if i-th key-phrase is present and $D_i > 0.51$<br>   $D_i$ - otherwise } and<br>→ list of document vectors = { center } where center is defined above.<br>Skip to Step 7.<br>Example: Suppose the current article is about "National Basketball Tournament" between "New York" and "Chicago". The agent has graded it to be relevant and the user agrees. While giving feedback, the user wants to convey to the agent that a similar "National Basketball Tournament" article between "New York" and "Wisconsin" will be irrelevant. The user, therefore, points out the key-phrase, "Wisconsin", which is absent in the current document. In such a scenario, the above step forms a negative cluster, in whose center, the key-phrase, "Wisconsin" s highlighted. |

Step 7

| Step 7 |
|---|
| For each new cluster formed, its threshold is computed.<br>If user_type is positive then the thresholds of all negative clusters whithin it are recomputed so as to exclude D<br>For each old cluster whose center or threshold has been modified, it is found out whether any document vector in its List of document vectors has been displaced from the cluster. Such document vectors are removed from the list and put into the List of displaced document vectors.<br>Each document vector in the List of displaced document vectors is routed back to the feedback learning algorithm. |

Feedback Learning

As in the previous section, Document representation the following symbolic convention will be used here.

| D | Represents a document and interchangably the representation of the document |
|---|---|
| $D_i$ | Distance function used to find the proximity between a document and a center |
| CC | Cluster center |
| $C^+$ | Denotes a positive center |
| $C^-$ | Denotes a negative cluster or a negative pocket in a positive cluster |
| i | Subscript value, denotes the i-th component of the associated item |

This is the part where the algorithm handles the user pointed data. The concept of supervised learning is employed here to learn from user feedback.

A few scenarios will be used to build the context to explain the process of feedback and analysis.

Scenario 1

The user assigns a class to a document, but gives only a set of absent key-phrases as reasons.

This can happen, esp. at the beginning of a session. Suppose the user is looking for "James Bond" and the document, which arrived, does not have that key-phrase at all.

This scenario can't be handled by a cluster-network because a document representation cannot be formed. In this case a soft rule is formed that says "if the set of key-phrases are absent in the document then put the document in the class shown". The rule is soft because it is not explicitly defined by the user. The agent assumes it to be a user intention.

Scenario 2

The user has shown a set of key-phrases to be of relevance earlier, and now a document which is won by that definition is being shown as negative with no new present key-phrases being shown.

This is something like user has liked "Finland", "Sweden", "Norway" earlier and now dislikes "Finland", "Sweden". In this case, the chances are that the user is changing the interest area. So a prompt must be give to the user, and depending on the user response, action should be taken.

Scenario 3

The user has chosen a set of key-phrases to be of relevance earlier, and now a document which is won by that definition is being shown as negative with at least one new key-phrase being shown.

This implies that the latest document must be marked as negative and also, it must be associated with the earlier positive as a conflict. This is for the reason that if a similar document comes in later and it is checked for positive contact, it will succeed. We will never know that the document is of negative connotation unless a tag of this conflict is maintained.

Scenario 4

The user has chosen a set of key-phrases to be of relevance earlier, and now a document which is won by that definition is being shown as negative with strictly a subset of the earlier positive present key-phrases as reasons.

A document with "computer" "virus" is said to be positive, but a document is said to be negative because of the presence of only "computer".

In this case also, there is a conflict but the conflict must not be associated. This is because the process should always look for positive context and then go for negative connotations. If the negative is embedded then it will always end up classifying similar documents as negative even if that has "computer" and "virus".

Scenario 5

The user has chosen a set of key-phrases to be of relevance earlier, and now a new document which is not won by that definition is being shown as negative with a superset of present key-phrases to the earlier positive ones as reasons.

"Deer" "Antelope" are shown to be positive but "Deer" "Antelope" "Hunting" are shown as negative. This is a conflict and must be registered so that similar documents later don't get misclassified as positives. Thus even these cases must form embedding.

The process of formation of a new cluster is described below.

Forming a new cluster

A cluster is formed using document representation, D.

Since a user can point out some very weakly occurring key-phrases also as a reason, the importance of these key-phrases should be boosted. It is done as follows.

1. In case a particular present key-phrase which has been pointed out as a reason occurs with a strength less than 0.51, it is jacked up to 0.51. In case it is an absent key-phrase, then it is assumed that the strength is of a high-order and taken as 0.75.
2. All key-phrases, which are shown, are marked strategic, and a strategic weight is assigned to each one of them. This is to take care of later documents. Suppose the current D on which the cluster is going to be formed has the weight for a key-phrase as 0.25. Then it is jacked up to 0.51. But when a similar document comes in the next time with weight of 0.25 for that key-phrase then it should be possible to report a distance of zero. Thus the value 0.25 must be multiplied by a weight, which is exactly equal to 0.51/0.25. This is the strategic weight for this key-phrase.
3. Jack up the weak weights. Call this D+
4. Attach strategic weights to strategic key-phrases
5. Assign D+ as a cluster center
6. Calculate threshold The full algorithms for accepting user feedback and acting upon it is by forming new clusters are laid out next.

As the user starts giving feedback, the algorithm starts creating a cluster network to record concept patterns. When it comes to classify a document these cluster-networks must be used to catch closeness in concept patterns.

The general assumption here is that a document is of importance eve if it contains just one important subject and several unimportant ones provided they don't contradict each other.

Thus, when a document arrives, the positive side of the document is checked first.

If the user has given some predefined rules then they get higher priority (for the simple reason that they are user-defined). These rules will be checked first. If any of these rules succeed, then further classification of the document is skipped.

Suppose the user-defined rules fail or there are no rules. In that case, the document is classified according to knowledge. Since the stress is on the positive side of the document, it is first checked whether the document has a positive component and thus for positive clusters.

In case some such cluster(s) win, there is a chance that this document is positive because of the context caught by one of these clusters. But before deciding the cluster, it must be checked whether there is any conflict with any negative cluster, i.e. whether the document actually belongs to a hole in the positive cluster. To do that, all the holes (which are also called embedding's) must be checked in each one of the positive clusters. If the document does fall in a hole, then that particular positive cluster is not a candidate cluster anymore.

Once this is done, either the winning positive cluster (in case some are left) is found or all the remaining negative clusters are checked to look for negative context. This way the winning one is identified.

If this method also fails to classify the document, then the possibility is that the document is either "unclassifiable" or it is in the scope of a soft rule. So, the soft rules are applied next.

The complete algorithm for classification follows.

Form the document representation D for a new document that has arrived.

---

1. Apply all hard rules⊕ to D
2. If hard rules apply successfully then
    Do
        Put D in the corresponding category
        Return
    Enddo
3. Find distance to all positive cluster centers.
4. If a set of positives win then
    For each winning positive cluster
    Do
        Put the positive cluster in positive candidacy list L+
        Find distances to all embedded negative clusters associated with the winning positive cluster
        If a set of these negatives win then
        Do
            Remove the positive cluster from L+
            Put the winning negative in L–
        Enddo
    Enddo
5. If L+ is non-empty then
    Do
        Find the winning positive cluster W+ for D
        Classify document as positive with W+ winning
        Return
    Enddo
    Do
        Find distances to all negative cluster centers
        If a set of negatives win then
        Do
            Find the winning negative cluster W–
            Classify document as negative with W– winning
            Return
        Enddo
    Enddo
    Else
    Do
        Classify document as unclassifiable
        Return
    Enddo
6. Apply soft rules to D
7. If a soft rule succeeds
    Do
        Put D in the corresponding category
        Return
    Enddo

---

The present invention provides a novel and efficient arrangement for offering personalized content delivery services to information seekers. This scheme of document representation, content strength analysis and user feedback processing can be improved by linking it with personal profiling programs to offer a platform for intelligent information bots that merge the current and the general "mood of the user" and "catch them by surprise" by pushing the right content. The scheme can also be extended to work on a plurality of document formats like word-processor files, presentations, spreadsheets, databases and white papers in other formats. The document representation and classification techniques, as contemplated by the present invention can work as an intelligent core search engine in an information access application environment.

While this invention has been described in connection with what is presently considered to be most practical and preferred documents, it is to be understood that the invention is not limited to the disclosed formats, but, on the contrary, is intended to cover various modifications and equivalent arrangements included within the spirit and scope of the appended claims.

What is claimed is:

1. A Topic Analysis System for analyzing documents to assess the relevance of documents with respect to a topic of interest to a user, said system comprising:

(a) a document evaluation subsystem for evaluating a document, said document evaluation subsystem comprises means for computing inter-relation among a plurality of key-phrases within the document, wherein the computation comprises the steps of:

computing the probability of occurrence of a key-phrase in the document depending on the occurrence of said plurality of key-phrases in the document, and computing the probability of non-occurrence of a key-phrase in the document depending on the occurrence of said plurality of key-phrases in the document; and (b) a clustering subsystem for representing a plurality of documents with respect to the topic associated with the user, said clustering subsystem comprising means for clustering the plurality of documents, wherein the plurality of documents includes a plurality of documents analyzed by said system and a plurality of documents analyzed by the user, and the representing comprises the steps of:

assigning a document of the plurality of documents to a hierarchically related plurality of positive clusters and plurality of negative clusters.

2. The system of claim 1, wherein the document evaluation subsystem comprises means for identifying a plurality of key-phrases of the topic present in a document, wherein said identification is based on text processing of the document.

3. The system of claim 2, wherein the document evaluation subsystem further comprises means for assigning strength value to a key-phrase of the document with respect to the topic based on the frequency of occurrence of said key-phrase in the document.

4. The system of claim 2, wherein the document evaluation subsystem further comprises means for computing plurality of probabilities of a key-phrase of the document with respect to the topic based on co-occurrence of said key-phrase with a key-phrase of the document with respect to the topic, wherein the computation is based on co-occurrence matrix of strength values of plurality of key-phrases of the topic.

5. The system of claim 2, wherein the document evaluation subsystem further comprises means for computing evaluation of the document with respect to the topic based on plurality of probabilities associated with plurality of key-phrases of the document with respect to the topic.

6. The system of claim 1, wherein said clustering subsystem comprises means for updating clusters based on evaluation of the document by said system and evaluation of the document by a user in a consistent way.

7. The system of claim 6, wherein said clustering subsystem further comprises means for updating clusters based on evaluation of the document by said system, wherein said updating comprises the means for identifying a cluster containing the document, removing the document from said cluster, and recomputing a cluster center of said cluster.

8. The system of claim 6, wherein said clustering subsystem further comprises means for updating clusters based on evaluation of the document by the user, wherein said evaluation of the document includes cluster type, and the updating comprises the steps of:

evaluating the said cluster type with respect to evaluation of the document by said system, and performing neural adaptation process.

9. The system of claim 6, wherein said clustering subsystem further comprises means for updating clusters based on evaluation of the document by the user, wherein the evaluation of the document includes the cluster type, and a plurality of absent key-phrases, and the updating comprises the steps of:

forming soft-rules based on said plurality of absent key-phrases, and forming a new cluster of type opposite to said cluster type.

10. The system of claim 6, wherein said clustering subsystem further comprises means for updating clusters based on evaluation of a document by the user, wherein the evaluation of the document includes cluster type, plurality of present key-phrases, and plurality of absent key-phrases, and the updating comprises the steps of:

forming a new cluster of type opposite of said cluster type based on said cluster type and said system evaluation of the document, deleting the document from cluster containing the document based on change in interest in said topic, performing neural adaptation process based on best possible matching of said plurality of present key-phrases with a cluster of clusters associated with said topic and the user, and forming a new cluster with said cluster type based on best possible matching of said plurality of present key-phrases with a cluster of clusters associated with the topic and the user.

11. The system of claim 6, wherein said clustering subsystem further comprises means for forming a new positive cluster of a document, wherein the formation comprises the steps of:

attaching strategic weights to strategic key-phrases of the document with respect to the topic, calculation of threshold, identification of overlap with any negative clusters of clusters associated with the topic and the user, and forming cluster embeddings.

12. The system of claim 6, wherein said clustering subsystem further comprises means for forming a new negative cluster of a document, wherein said formation comprises the steps of:

attaching strategic weights to strategic key-phrases of the document with respect to the topic, calculation of threshold, identification of overlap with any positive clusters of clusters associated with the topic and the user, and forming cluster embeddings.

13. The system of claim 6, wherein said clustering subsystem further comprises means for performing neural adaptation process of a cluster with respect to the document, wherein said performing comprises the steps of:

attaching the document to said cluster, determining new cluster center of said cluster, reclassifying plurality of documents based on new threshold of said cluster, and forming plurality of new clusters based on plurality of documents that fall outside said cluster.

* * * * *